US011314878B2

(12) United States Patent
Shetty et al.

(10) Patent No.: US 11,314,878 B2
(45) Date of Patent: Apr. 26, 2022

(54) SECURE LINK SHARING

(71) Applicant: VMWARE, INC., Palo Alto, CA (US)

(72) Inventors: Rohit Pradeep Shetty, Bangalore (IN); Sharun Varghese Samuel, Bangalore (IN); Erich Peter Stuntebeck, Atlanta, GA (US); Ramani Panchapakesan, Bangalore (IN); Craig Farley Newell, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 182 days.

(21) Appl. No.: 16/689,094

(22) Filed: Nov. 20, 2019

(65) Prior Publication Data

US 2021/0073400 A1      Mar. 11, 2021

(30) Foreign Application Priority Data

Sep. 10, 2019  (IN) .............................. 201941036349

(51) Int. Cl.
| | |
|---|---|
| *G06F 21/62* | (2013.01) |
| *H04L 29/06* | (2006.01) |
| *G06F 3/0482* | (2013.01) |
| *H04L 67/02* | (2022.01) |
| *G06F 9/445* | (2018.01) |

(52) U.S. Cl.
CPC ............ *G06F 21/62* (2013.01); *G06F 3/0482* (2013.01); *G06F 9/445* (2013.01); *H04L 63/0428* (2013.01); *H04L 67/02* (2013.01)

(58) Field of Classification Search
CPC ........................... H04L 63/0428; H04L 67/02
See application file for complete search history.

(56) References Cited

U.S. PATENT DOCUMENTS

| | | | |
|---|---|---|---|
| 8,935,798 B1* | 1/2015 | Smith ................. | G06F 16/9574 |
| | | | 726/26 |
| 2012/0185949 A1* | 7/2012 | Phillips .................. | H04L 67/04 |
| | | | 726/26 |
| 2017/0201496 A1* | 7/2017 | Luff ..................... | G06F 16/9566 |

* cited by examiner

*Primary Examiner* — Esther B. Henderson
(74) *Attorney, Agent, or Firm* — Thomas | Horstemeyer LLP

(57) ABSTRACT

Disclosed are various approaches for sharing uniform resource locators (URLs) and enforcing browser restrictions along with a shared URL. Browser restrictions can be identified by appending commands to the shared URL that instruct the receiving browser to activate certain browser restrictions. Browser restrictions can also be enforced using a URL restriction validator, which is a server process that can facilitate enforcement of browser restrictions along with a shared URL.

18 Claims, 13 Drawing Sheets

SECURE LINK SHARING

RELATED APPLICATIONS

Benefit is claimed under 35 U.S.C. 119(a)-(d) to Foreign Application Serial No. 201941036349 filed in India entitled "SECURE LINK SHARING", on Sep. 10, 2019, by VMWARE, INC., which is herein incorporated in its entirety by reference for all purposes.

BACKGROUND

In modern computing environments, the browser is becoming one of the most-used applications on the desktop. In collaborative environments, users are often sharing uniform resource locators (URLs) or links with other users for various reasons. However, sharing a link with another user can be accompanied with risks. For example, certain websites might invoke a local runtime environment such as Java, execute plugins or extensions on a user's browser, or install tracking cookies.

Therefore, users or enterprises can create policies that require links shared between users be opened with certain safeguards in place. For example, a user might request that a link he or she is about to share with another user be opened in a private browsing mode, or an "incognito mode." As another example, an enterprise might create a rule that requests that users take care in the sharing or opening of links between users. However, an automated framework that enforces browser or URL restrictions on URLs shared between users can aid in the security of link sharing.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples of a framework that allows for sharing uniform resource locators (URLs) or links from a sending browser to a recipient browser. The URLs can be shared along with an indication that the URL should be opened by the recipient browser with certain browser or URL restrictions enabled. In the context of this disclosure, a browser or URL restriction means that a certain feature or plugin associated with a browser is disabled or blocked when a shared URL is opened by the recipient browser. In one scenario, a URL can be shared along with an indication that the URL should be opened in a private browsing mode by the recipient browser.

In a private browsing mode, certain features of the browser can be disabled, such as data persistence across sessions, the disabling or blocking of tracking cookies, and the disabling or blocking of certain plugin functionality, such as content or video plugins like Adobe Flash®. The private browsing mode can also disable or block runtime environments like Java®, and scripting language execution such as JavaScript. By forcing the recipient browser to disable certain browser features or to access the link in a private browsing mode, security of the sharing of the URL can be improved.

As noted above, a web browser, or a browser, can be the application on a user's device that receives the most usage. Users can often access email or perform work or other personal tasks within a browser. In the course of using a browser, a user might come across a page or URL that the user wishes to share with another user or group of users. However, the user might want to share the URL in a manner that forces the recipient browser to access the URL in a private browsing mode or with certain browser restrictions being enforced. Examples of the disclosure allow the sender of the URL, or the sending browser, to generate a shared URL that includes an indication that the URL should be accessed by the recipient browser with certain browser restrictions enabled.

Figure 1A:
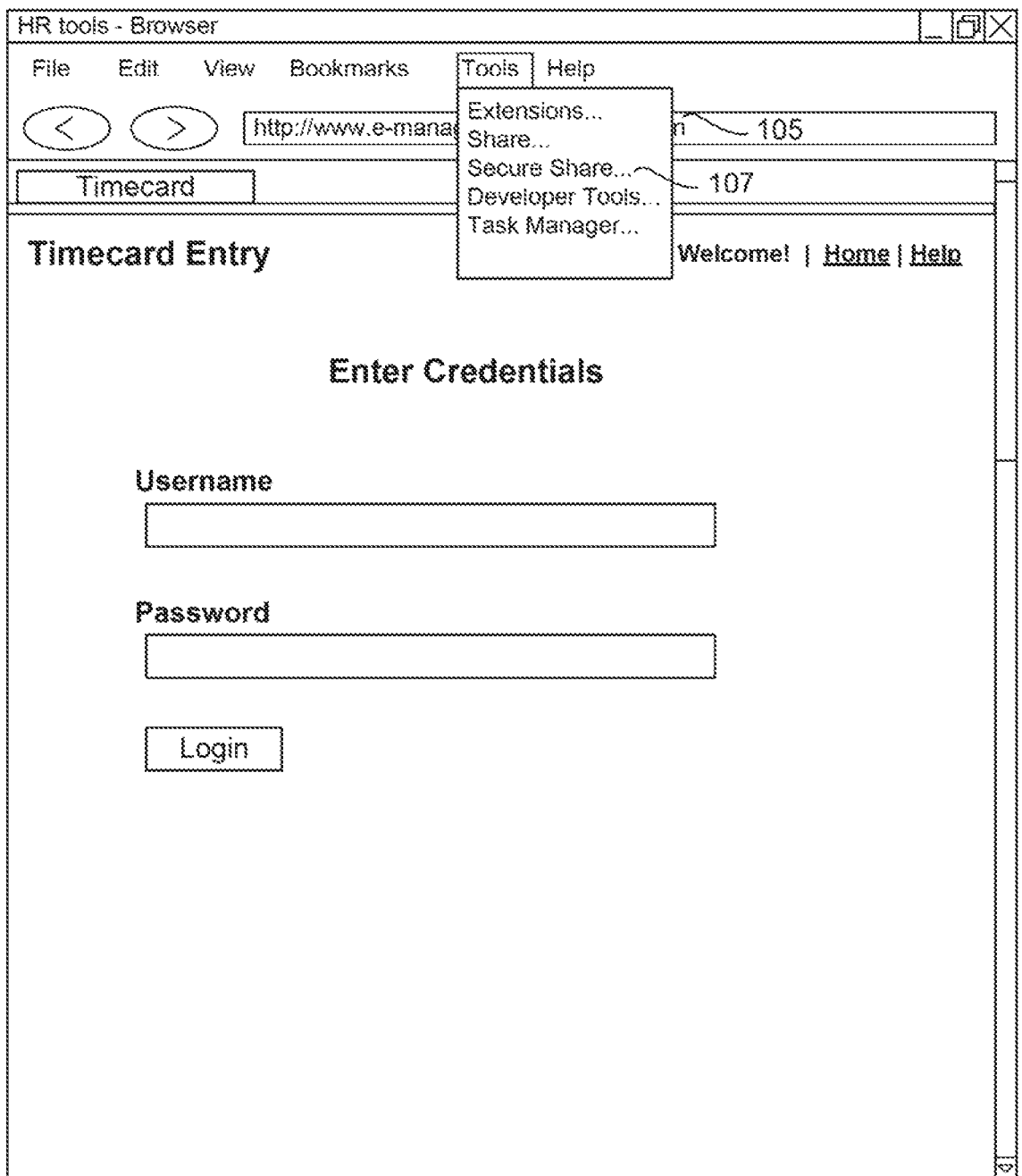
FIG. 1A is an example browser user interface according to various examples of the disclosure.

To demonstrate an example according to the disclosure, reference is made to FIG. 1A, which illustrates a browser 103 that can be executed by a computing device. The depicted browser 103 can be thought of as the sending browser because it is the browser from which a URL is going to be shared. In the depicted browser 103, a particular page that is associated with a particular URL 105 is rendered in the browser 103. If the user wishes to share the URL 105 with another user, the user can access a menu option 107 that accesses a secure sharing feature. In the context of this disclosure, secure sharing of a URL 105 means the sharing of a URL 105 with browser restrictions enforced upon the recipient of the shared URL. For example, the URL can be shared such that the recipient browser is forced to open the URL in a private browsing mode.

Figure 1B:
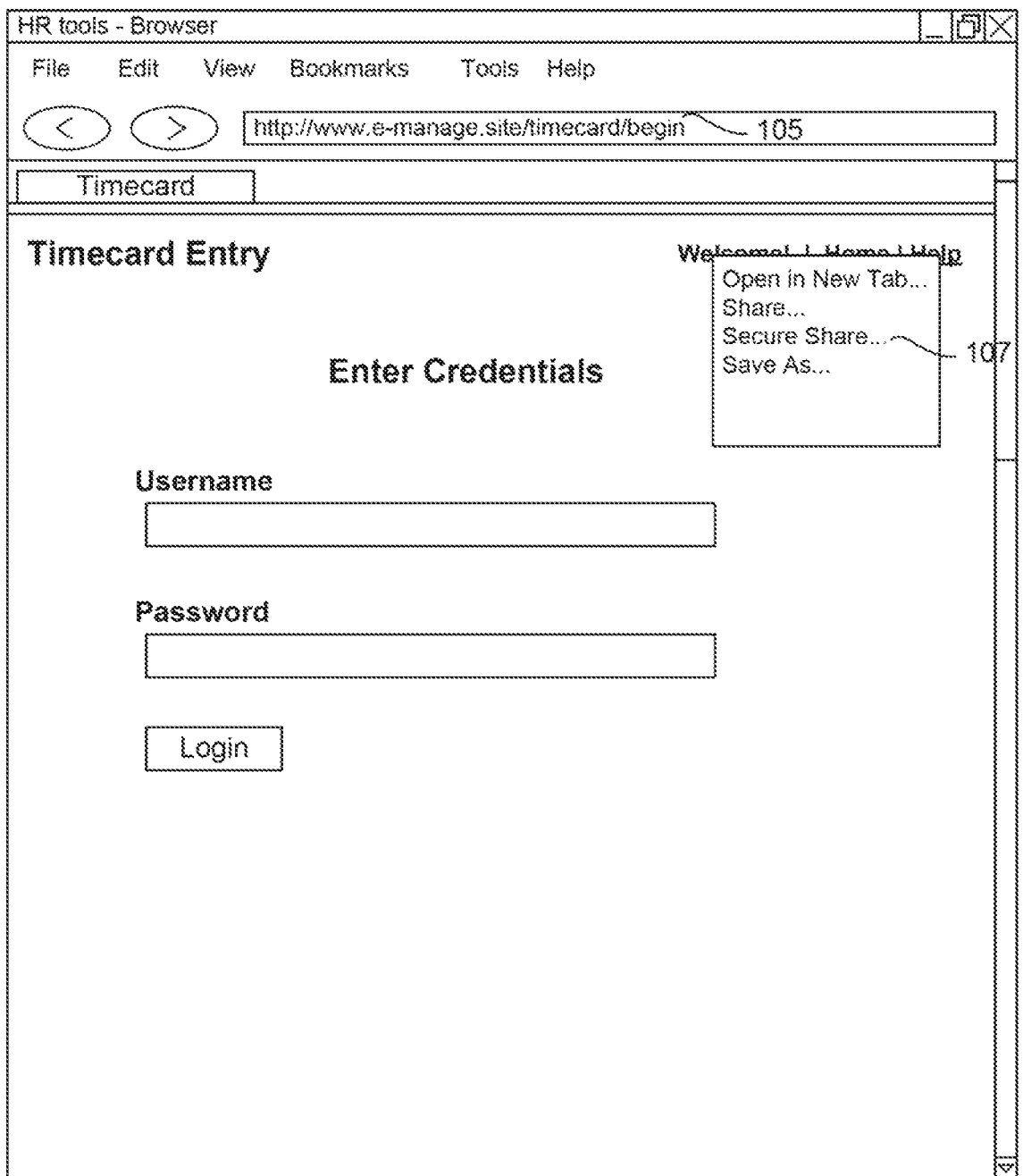
FIG. 1B is an example browser user interface according to various examples of the disclosure.

Referring to FIG. 1B, shown is an alternative scenario. In the example of FIG. 1B, the sending user can access the secure sharing feature of the browser 103 to share a URL by right-clicking, long-pressing, or performing another gesture for accessing a contextual menu associated with a hyperlink in the browser 103. Upon detecting a right-click, long-press, of contextual menu option, the browser 103 detect user selection of an option 107 that activates the secure sharing feature of the browser 103. Upon activating the menu option 107, the browser 103 can generate a shared URL, which represents the URL along with an indication that a recipient browser 103 should access the shared URL with certain browser restrictions enabled, such as by accessing the shared URL in a private browsing or incognito mode. The shared URL can be different from the URL 105 being accessed or used by the sharing browser because the browser 103 can modify the URL 105 to enable enforcement of browser restrictions on the recipient browser 103.

Figure 1C:
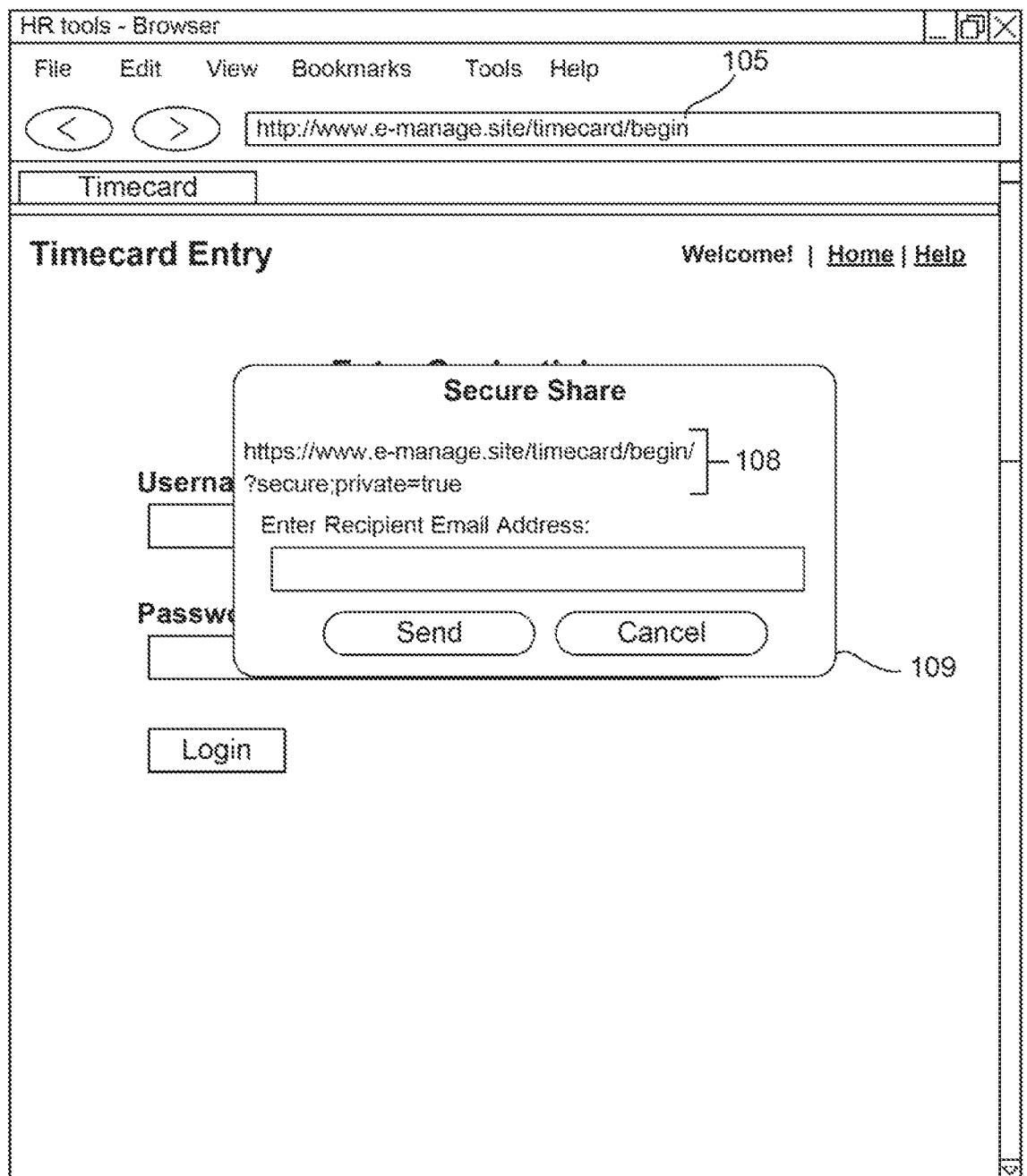
FIG. 1C is an example browser user interface according to various examples of the disclosure.

Continuing the example of FIGS. 1A-1B, reference is now made to FIG. 1C. In FIG. 1C, an example of a shared URL 108 generated by the sending browser 103 is shown. FIG. 1C illustrates on the shared URL 108 can vary from the URL 105 that is selected for sharing by the user. The sending browser 103 has modified the URL 105 selected for sharing by the user by appending one or more commands that specify browser restrictions that should be enforced on the recipient browser 103. Additionally, the user interface element 109 can also provide the sending browser 103 with an option to enter a recipient email address so that the browser 103 can send the shared URL 108 to the recipient on behalf of the user.

In some implementations, the browser 103 can generate the shared URL 108 and the user can transmit the shared URL 108 to a recipient as he or she sees fit. For example, the browser 103 can copy the shared URL 108 to a clipboard or temporary memory space of the device running the browser 103. In another scenario, the browser 103 can display the shared URL 108, and the user can copy, paste, and send the shared URL 108 to another user through a communication mechanism of their choice.

The shared URL 108 of FIG. 1C contains a command that forces the recipient browser 103 to open the shared URL 108 in a private browsing mode. The command is embedded within the shared URL 108 as a URL parameter. The URL parameters can be embedded as a parameter in a URL query string. In the example shown, the URL parameter "private=true" instructs the recipient browser 103 to open the shared URL 108 in a private browsing mode where data persistence and cookies are disabled. In one implementation, the URL parameters can be hashed or obfuscated before they are appended to the URL in a URL query string. The shared URL 108 implementation shown in FIG. 1C assumes that the recipient browser 103 will enforce or act on the command embedded in the shared URL 108 and that the receiving user is not able to alter the shared URL 108.

Figure 1D:
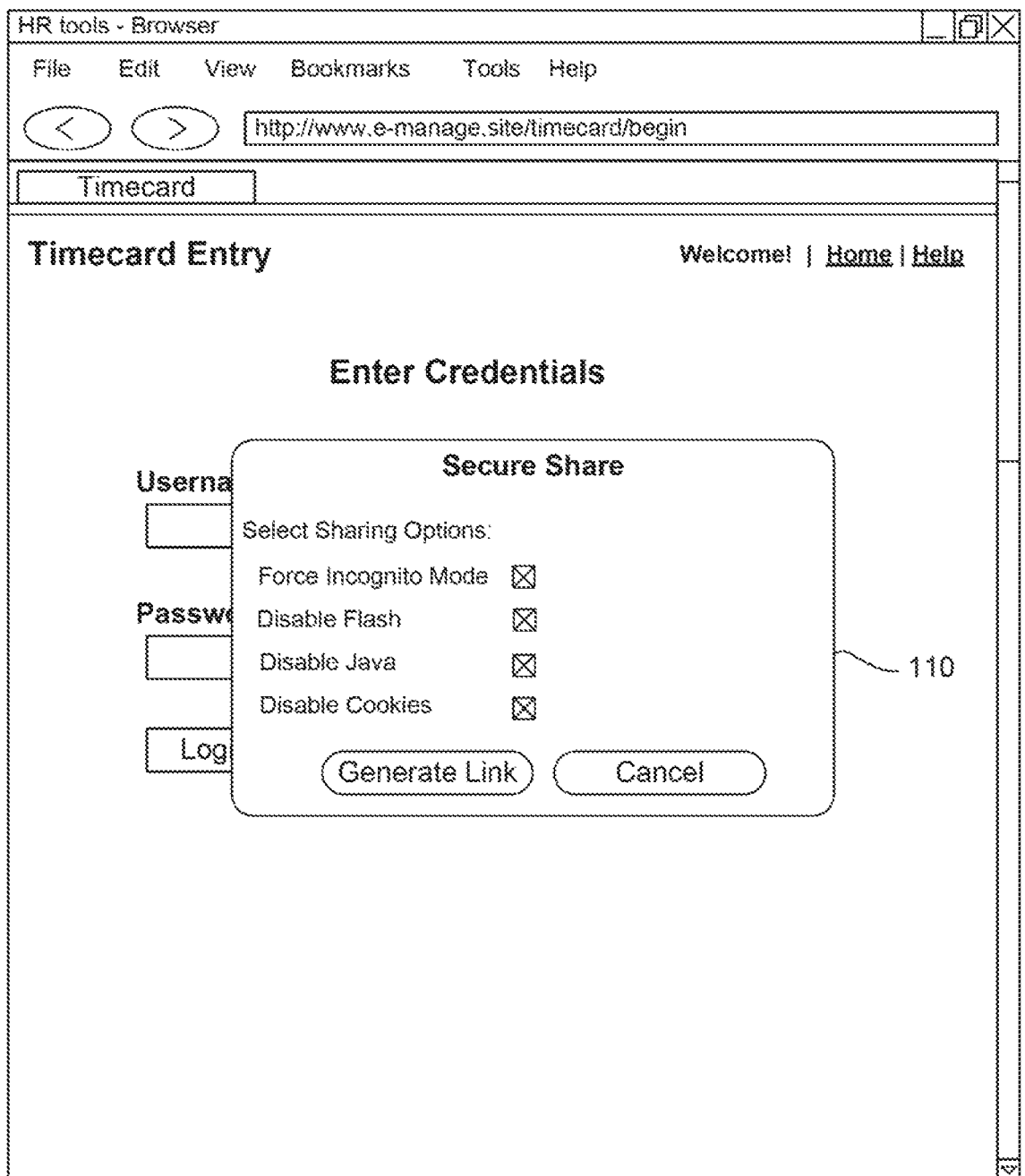
FIG. 1D is an example browser user interface according to various examples of the disclosure.

Referring to FIG. 1D, shown is an alternative example of how a user can share a URL 105 along with commands that force the receiving browser to enforce one or more browser or URL restrictions. In the example of FIG. 1D, a user interface element 110 can allow the sending user to select or more options for sharing the URL 105 along with browser restrictions. As shown in FIG. 1D, the browser 103 can also allow the user to require the recipient browser 103 to disable other features or plugins when opening the shared URL 108. For example, the sending user can disable video plugins, built-in runtime environments, and tracking cookies. If one or more of these options are selected, the browser 108 can generate a shared URL 108 that includes commands that instruct the recipient browser 103 to enforce the selected restrictions.

In one implementation, the browser can generate a shared URL 108 that points to a server running a URL restriction validator service. A URL restriction validator service can represent a server that validates that the browser 103 accessing the shared URL 108 is enforcing the selected URL restrictions before providing the content at the URL 105 to the recipient browser 103. The URL restriction validator service can present an error message to the user rather than the content located at the URL 105 if the URL restrictions are not being enforced by the recipient browser 103.

Figure 1E:
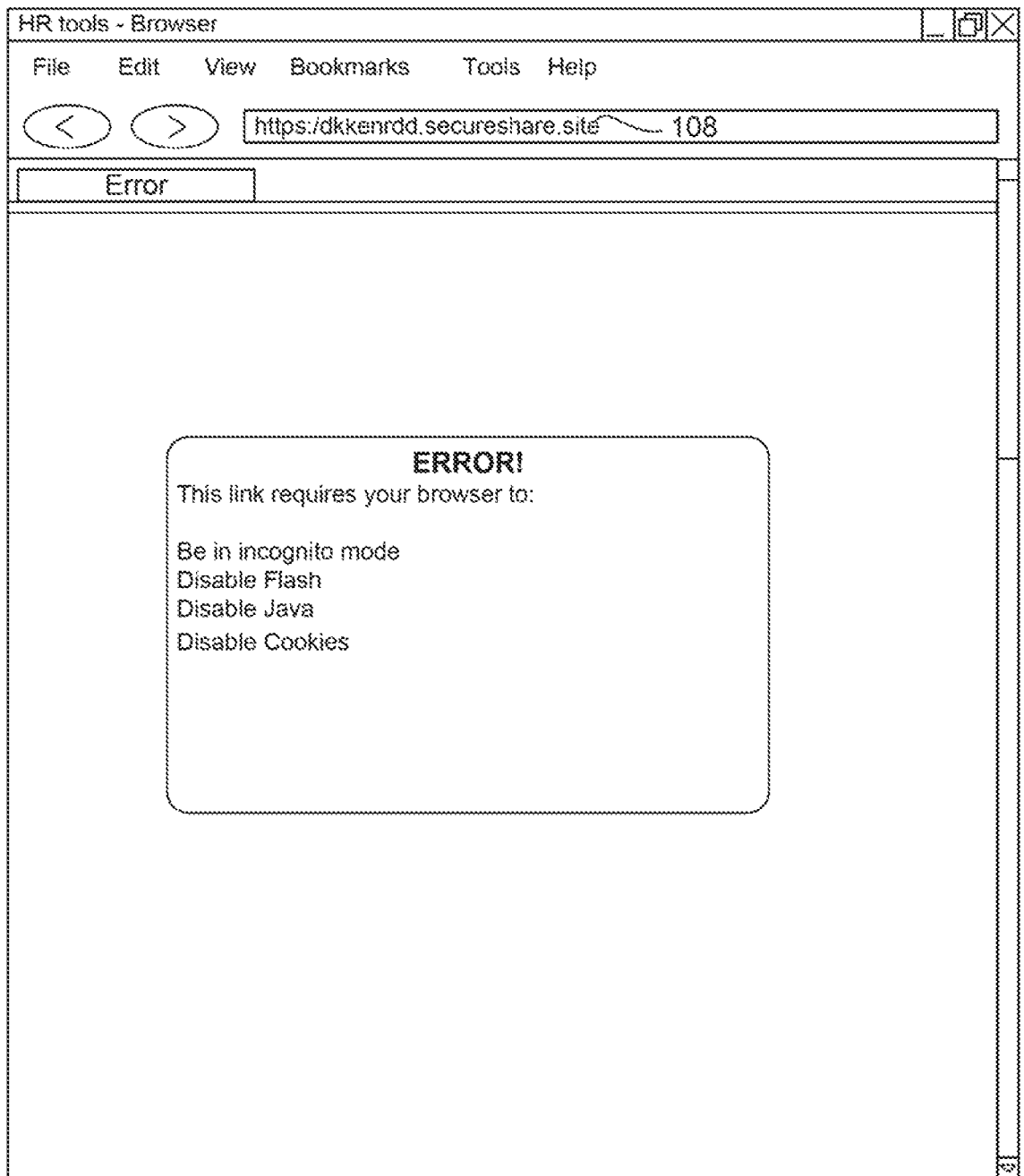
FIG. 1E is an example browser user interface according to various examples of the disclosure.

To illustrate this concept, reference is made to FIG. 1E. In the example of FIG. 1E, the shared URL 108 represents a link to another server rather than the URL 105 shared by the user. In this implementation, a URL restriction validator service can act as a proxy to the URL 105 and validate the selected URL restrictions before redirecting the recipient browser 103 to the URL 105. The URL restriction validator service can validate the URL restrictions by sending a page that includes server-side code as well as client-side code that tests whether the selected URL restrictions are being enforced by the browser 103 that is accessing the shared URL 108. For example, the URL restriction validator service can present a page that includes JavaScript code that attempts to start a local runtime environment, such as Java, run Flash code, or store a tracking cookie. If any of these attempts are successful, the URL restriction validator service can determine that the URL restrictions are not being enforced and present an error message rather than the content at the URL 105.

Figure 2:
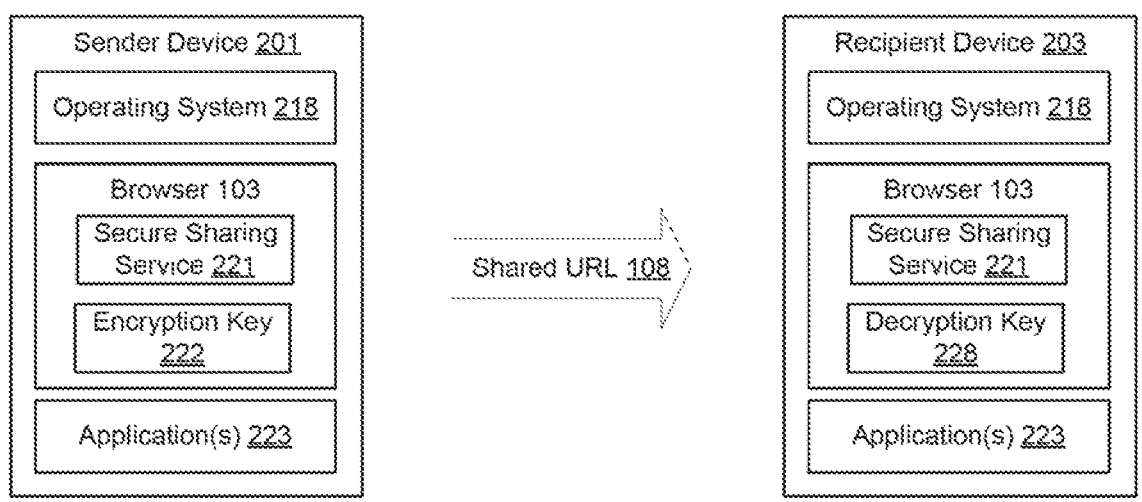
FIG. 2 is a drawing of a computing device according to various examples of the disclosure.

FIG. 2 illustrates an example of certain elements of as environment that includes a sender device 201 and a recipient device 203 according to one example of the disclosure. The sender device 201 and recipient device 203 can both represent a computing device that can implement examples of the disclosure. A computing device can include, for example, a processor-based computer system. According to various examples, a computing device can be in the form of a desktop computer, a laptop computer, a personal digital assistant, a mobile phone, a smartphone, or a tablet computer system. The computing device can be coupled to or have a display on which a user interface associated with the browser 103 and potentially other applications can be rendered. In the context of this disclosure, a browser 103 executed by a sender device 201, or a device from which a particular URL 105 is shared, is referred to as a sending browser or sender browser. Conversely, a browser 103 executed by a recipient device 203, or a device with which a URL 105 is shared as a shared URL 108, is referred to as a recipient browser or receiving browser.

Accordingly, a browser 103 can be installed on the sender device 201 and recipient device 203. The browser 103, when executed, can retrieve and render content pages, such as web pages. In some examples, the content pages can be retrieved over a network connection and/or include hyperlinks to other network pages. The browser 103 can also include browser extensions or plugins that can extend the functionality of the browser 103 and the content that can be rendered within the browser 103. Additionally, the browser 103 can have an additional runtime environment, such as Java, that can execute code provided by a server, which can also extend the functionality of the browser 103.

However, plugins, extensions, and additional runtime environments can also present security challenges. Not all plugins and extensions are provided by trusted developers, and they may contain security flaws or security holes. Additionally, a runtime environment such as Java can present security issues due to its potentially privileged access to local system resources. Additionally, the browser 103 can also be equipped with cookies functionality, which can allow sites to install tracking cookies, authentication tokens, or other data that persists across browser sessions.

The browser 103 can also include a private browsing mode, which is often referred to as an incognito mode. In the private browsing mode, certain features of the browser are disabled to improve the privacy, and in cases the security, of a browsing session. The private browsing mode can disable tracking cookie functionality and data persistence across browsing sessions. The private browsing mode can also disable certain extensions or plugins that the user might not wish to execute in private browsing sessions.

In one implementation of this disclosure, the browser 103 can have a secure sharing service 221 implemented as a plugin, extension, or natively within the browser 103. The secure sharing service 221, in one aspect, can generate a shared URL 108 based upon a URL 105 that a user of the sending browser wishes to share with another user. In one implementation, the shared URL 108 can be the URL 105 with one or more commands appended to the URL 105 instructing the recipient browser to enforce browser restrictions that are either selected by the user or defined as an enterprise policy that should accompany shared URLs 108. In another implementation, the shared URL 108 can be generated by encrypting the URL 105 with an encryption key 222 embedded in or accessible to the browser 103. The recipient browser 103 can decrypt the shared URL 108 using a corresponding decryption key 228. The encryption methodology utilized can include symmetrical encryption, asymmetrical encryption, or public-private key encryption.

If encrypted, the URL 105 can be modified to include commands to enforce browser restrictions and then encrypted. The shared URL 108 can be encrypted so that, if modified by the user to, the shared URL 108 will be inaccessible by the recipient browser 103. Additionally, encrypting the URL 105 to generate the shared URL 108 reduces the possibility of a user attempting to remove commands to enforce browser restrictions from the URL 105. In this scenario, the recipient browser 103 can be configured to hide or obfuscate the shared URL 108 from the user.

The computing device 201 can also execute an operating system 218 and other applications 223 that facilitate operation and/or management of the computing device 201. A discussion of the operating system 218 and these other applications 223 that can be executed by the computing device 201 are not necessary for an understanding of the examples of this disclosure.

Figure 3:
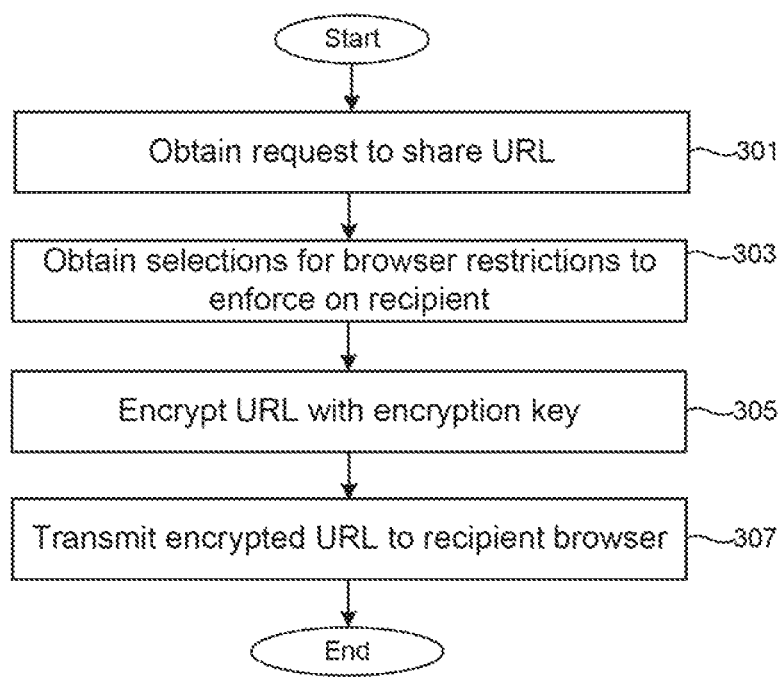
FIG. 3 is a flowchart that illustrates functionality according to an example of the disclosure.

Referring next to FIG. 3, shown is a flowchart and illustrates functionality of the browser 103 according to an example of the disclosure. The functionality illustrated in FIG. 3 can also be provided by an extension or plugin. In other examples, the functionality illustrated in FIG. 3 can also be provided natively within the browser 103. Although the flowchart is discussed with respect to being performed within the secure sharing service 221 of the browser 103, the functionality can also be implemented using a different architecture.

First, at step 301, the secure sharing service 221 can obtain a request to share a URL 105. The request to share the URL 105 can be triggered by the user selecting a secure sharing feature of the browser 103. The secure sharing feature of the browser 103 can allow the user to share the URL 105 while also enforcing browser restrictions on the receiving browser 103. For example, the user might wish to select certain restrictions that should accompany the sharing of the URL 105, or an enterprise policy embedded within the browser 103 or stored on the user's device might specify certain restrictions that should accompany the sharing of the URL 105. The enterprise policy can be installed on the device executing the browser 103 by a remotely or locally executed management service with which the device is enrolled as a managed device.

Next, at step 303, the browser 103 can obtain selections for browser restrictions that should be enforced on the receiving browser 103. The selections can be obtained through a user interface element that allows a user to choose which restrictions should be associated with a shared URL 108. The selections can also be obtained from a policy that is installed on a computing device 201 by a management service or mobile device management (MDM) framework with which the computing device 201 is enrolled as a managed device.

At step 305, the browser 103 can encrypt the URL 105 with an encryption key 222 to generate the shared URL 108. In one implementation, the shared URL 108 can be formed by adding commands to the URL 103 that can be enforced by the receiving browser 103 to enforce the browser restrictions selected at step 303. The URL 105 can be encrypted so that the receiving user cannot modify the shared URL 108 to remove commands that enforce the browser restrictions. In this scenario, modifying the shared URL 108 that is encrypted will cause the shared URL 108 to be unusable by the receiving browser 103 because decryption of the shared URL 108 will fail.

At step 307, the shared URL 108 can be transmitted to the receiving browser 103. The shared URL 108 can be shared by a user in an email or other messaging service. The shared URL 108 can also be transmitted directly to the receiving browser 103 by the sending browser 103 using an integrated messaging feature that permits browser 103 to browser 103 communication among users. The receiving browser 103 can decrypt the shared URL 108 using a decryption key 228. The decryption key 228 can be the same as the encryption key 222 in the case of a symmetric encryption scheme. The decryption key 228 can also be a private key that corresponds to a public key used to encrypt the URL 105 to generate the shared URL 108. After transmission of the shared URL 108 to the receiving browser 103, the process can proceed to completion.

Figure 4:
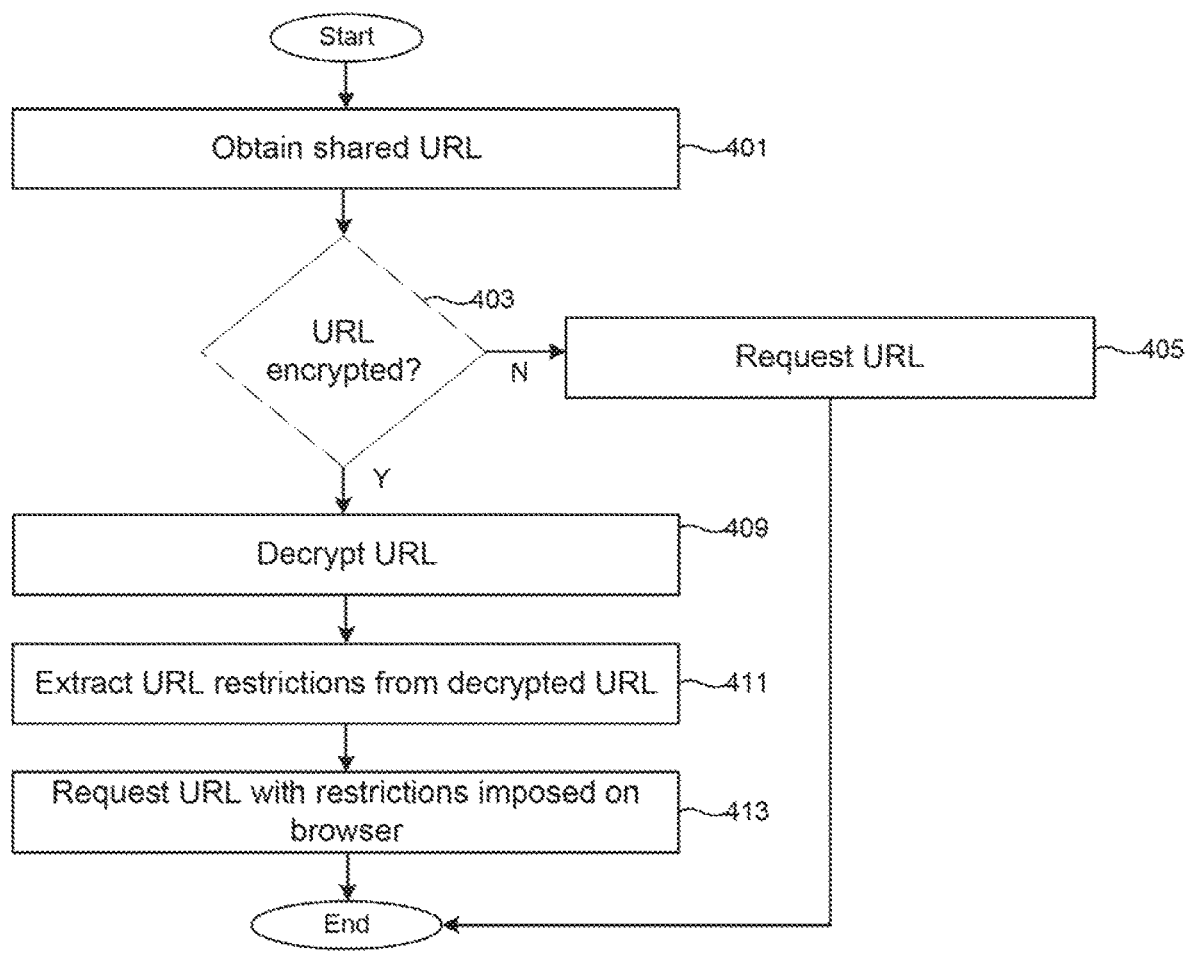
FIG. 4 is a flowchart that illustrates functionality according to an example of the disclosure.

Referring next to FIG. 4, shown is a flowchart and illustrates functionality of the browser 103 according to an example of the disclosure. The functionality illustrated in FIG. 4 can be implemented by the receiving browser 103, or a browser 103 with which a shared URL 108 is provided. Although the flowchart is discussed with respect to being performed within the browser 103, the functionality can also be implemented by a browser extension or plug-in. FIG. 4 illustrates a process whereby the browser 103 can receive a shared URL 108 that has been encrypted by a sending browser 103, such as in the process shown in FIG. 3.

At step 401, the browser 103 can obtain a shared URL 108. The shared URL 108 can be obtained by a user, who copies the shared URL 108 from another application, such as an email application or messaging application. The user can then paste the shared URL 108 within the browser 103 address bar or otherwise cause the browser 103 to access the shared URL 108.

At step 403, the browser 103 can determine whether the shared URL 108 is encrypted. The browser 103 can make this determination by identifying a signature embedded within the shared URL 108 by the encryption algorithm used to generate the shared URL 108. The browser 103 can also make this determination if attempting to follow the shared URL 108 without decrypting it results in a failure, a HTTP 404 error, or a domain name system (DNS) error. If the shared URL 108 returns an error without decryption, the browser 103 can attempt decryption of the shared URL 108. If the shared URL 108 is not encrypted, the process can proceed to step 405 from step 403.

At step 405, the browser 103 can request a page or data from the shared URL 108 without decryption of the shared URL 108. In this step, the shared URL 108 can be handled just as any other conventionally shared URL.

At step 409, the browser 103 can decrypt the shared URL 108. The browser 103 can decrypt the shared URL 108. The browser 103 can decrypt the shared URL 108 using a decryption key 228. The decryption key 228 can be the same as the encryption key 222 used to encrypt the shared URL 108 in the case of a symmetric encryption scheme. The decryption key 228 can also be a private key that corresponds to a public key used to encrypt the URI. 105 to generate the shared URL 108.

At step 411, the browser 103 can extract commands that identify the URL restrictions to be enforced on the browser 103 when accessing the URL 105. The commands can be added to the URL 105 as URL parameters. In some implementations, the browser 103 can hide the decrypted URL from the user so that the user is unable to remove or edit commands embedded into the decrypted URL that identify browser restrictions.

At step 413, the browser 103 can request data or a page from the URL 105 with the browser restrictions imposed on the browser 103 for the request. The restrictions can include disabling runtime environments such as Java, disabling plug-ins or extensions such as Adobe Flash®, disabling cookies, or requiring that the browser 103 open the URL 105 in a private browsing mode where user tracking is disabled.

Figure 5:
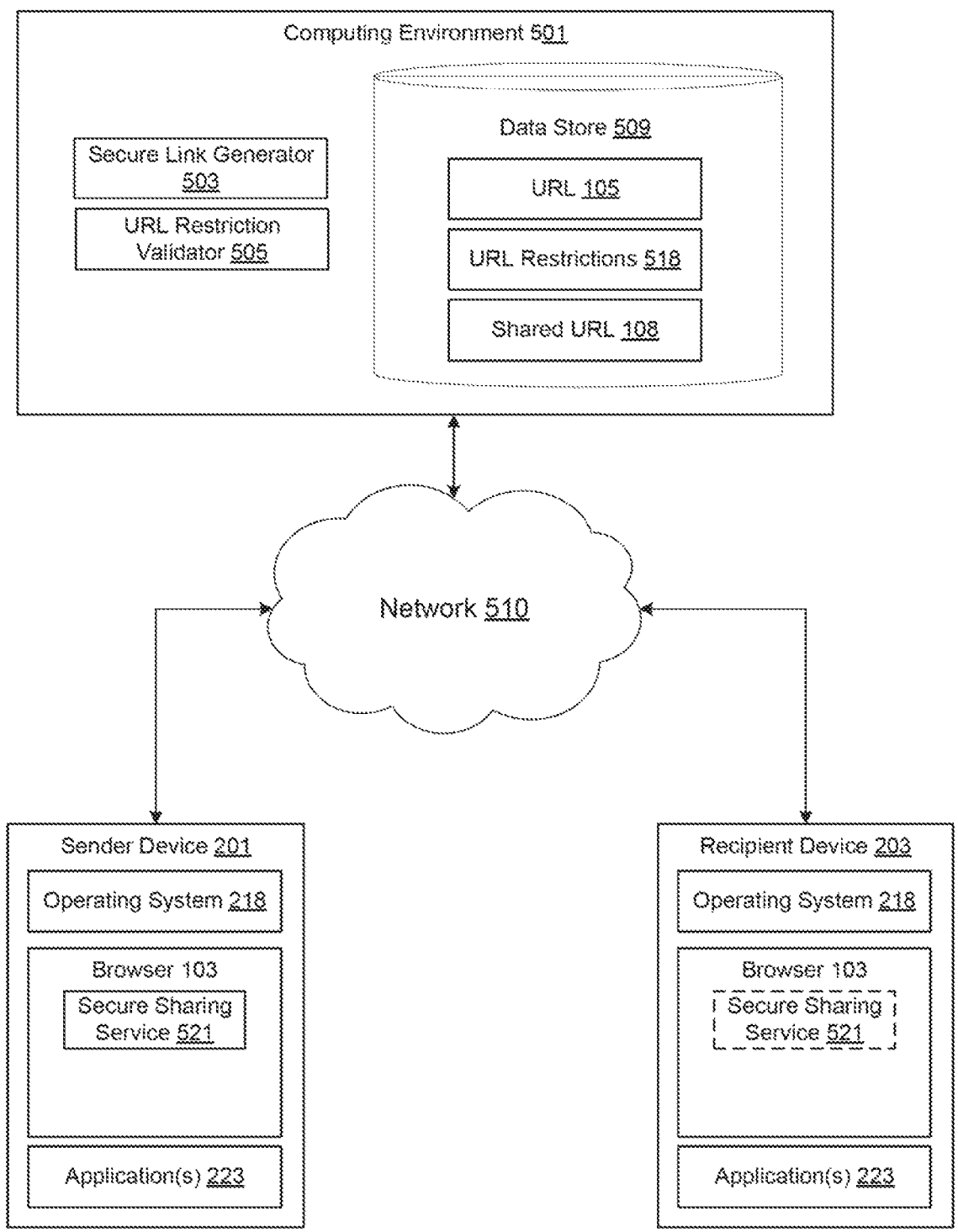
FIG. 5 is a networked environment according to various examples of the disclosure.

Referring next to FIG. 5, shown is an example of a networked environment 500. The networked environment 500 includes a computing environment 501, a sender device 201, and a recipient device 203, which are in data communication with each other across a network 510.

The network 510 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 510 can also include a combination of two or more networks 510. Examples of networks 510 can include the Internet, intranets, extranets, virtual private networks (VPNs), and similar networks.

The computing environment 501 can include, for example, a server computer or any other system providing computing capability. Alternatively, the computing environment 501 can employ a plurality of computing devices that can be arranged, for example, in one or more server banks or computer banks or other arrangements. These computing devices can be located in a single installation or can be distributed among many different geographical locations. For example, the computing environment 501 can include a plurality of computing devices that together can include a hosted computing resource, a grid computing resource or any other distributed computing arrangement. In some cases, the computing environment 501 can correspond to an elastic computing resource where the allotted capacity of processing, network, storage, or other computing-related resources can vary over time.

Various applications or other functionality can be executed in the computing environment 501 according to various examples. The components executed in the computing environment 501, for example, can include a secure link generator 503 and a URL restriction validator 505. Also, various data is stored in a data store 509 that is accessible to the computing environment 501. The data store 509 can be representative of a plurality of data stores, which can include relational databases, object-oriented databases, hierarchical databases, hash tables or similar key-value data stores, as well as other data storage applications or data structures. The data stored in the data store 509 is associated with the operation of the computing environment 501. This data can include data about URLs 105, shared URLs 108, and URL restrictions 518 that accompany a shared URL 108.

A URL 105 in the data store 509 can be a URL 105 that a sending user wishes to share with another user. The user can request, through the secure link generator 503, a shared URL 108 that facilitates enforcement of browser restrictions on the receiving browser 103 with which the shared URL 108 is provided. The shared URL 108 can be generated by the secure link generator 503 and vary from the URL 105. The shared URL 108 can be linked to the URL 105 within the data store 509. URL restrictions 518 can also be linked to the shared URL 108 and the URL 105 within the data store 509. The URL restrictions 518 can identify browser restrictions that should be enforced on the recipient device 203 when following or accessing data through the shared URL 108.

The browser 103 executed by the sender device 201 can also include a secure sharing service 521. A browser 103 executed by the recipient device 203 can be optionally equipped with the secure sharing service 521 in the event that it is the same version of browser 103 as executed by the sender device 201. The secure sharing service 521 can be integrated into the browser 103 or implemented as a plug-in or extension. The secure sharing service 521 can generate a shared URL 108 on behalf of a user wishing to share a URL 105 with another user or a recipient device 203.

The secure link generator 503 can generate a shared URL 108 on behalf of a browser 103 executed by a sender device 201. The secure link generator 503 can generate a shared URL 108 in response to a request from the secure sharing service 521 executed by the sender device 201. The request can include a URL 105 that a user wishes to share with another user or a recipient device 203. In some implementations, the request can include browser restrictions that the user has selected or that are defined by an enterprise policy. The secure link generator 503 can generate a shared URL 108 that differs from the URL 105. In one implementation, the shared URL 108 can be generated by adding commands identifying browser restrictions. In another implementation, the shared URL 108 can be an encrypted form of the URL 105. In other implementations, the shared URL 108 can direct a browser 103 accessing the shared URL 108 to a server address that is served by the URL restriction validator 505, whose functionality is described below.

The URL restriction validator 505 can receive a HTTP request from a browser 103 following a shared URL 108 generated by the secure link generator 503. The URL restriction validator 505 can identify URL restrictions 518 should be enforced with respect to the shared URL 108 and validate that the browser 103 following the shared URL 108 is enforcing the URL restrictions 518.

The URL restriction validator 505 can validate that the browser 103 enforcing the URL restrictions 518 by initially providing a page that includes client-side code that validates whether the URL restrictions 518 are being enforced before redirecting the browser 103 to the URL 105. For example, the page can include code that determines whether Java is enabled, Adobe Flash® is enabled, or whether tracking cookies are enabled in the browser 103. The code embedded in the page can be implemented in JavaScript. Should the browser 103 comply with the URL restrictions 518, the URL restriction validator 505 can redirect the browser 103 the URL 105. If the browser 103 does not comply with the URL restrictions 518, the URL restriction validator 505 can present an error message to the browser 103.

In another implementation, the URL restriction validator 505 can ensure that the URL restrictions 518 are enforced on the recipient device 203 by creating a virtual desktop infrastructure (VDI) session that runs a separate browser 103 with the URL restrictions 518 enforced. The browser 103 within the VDI session can retrieve the content from the URL 105 and provide an image, such as a bitmap, of the contents to the browser 103 running on the recipient device 203. In this implementation, the browser 103 on the recipient device 203 is not directly accessing the URL 105. Instead, the browser 103 on the recipient device 203 is only accessing imagery or video that corresponds to what the browser 103 running on the VDI session has retrieved from the URL 105. The browser 103 on the recipient device 203 is not provided the markup language retrieved from the URL 105 in this scenario.

In another implementation, the URL restriction validator 505 can ensure that the URL restrictions 518 are enforced on the recipient device 203 by utilizing any other Remote Browser Isolation system, which can include a VDI implementation, a containerization architecture, or other remote browser solutions from which the URL 105 is accessed on behalf of the recipient device 203.

Figure 6:
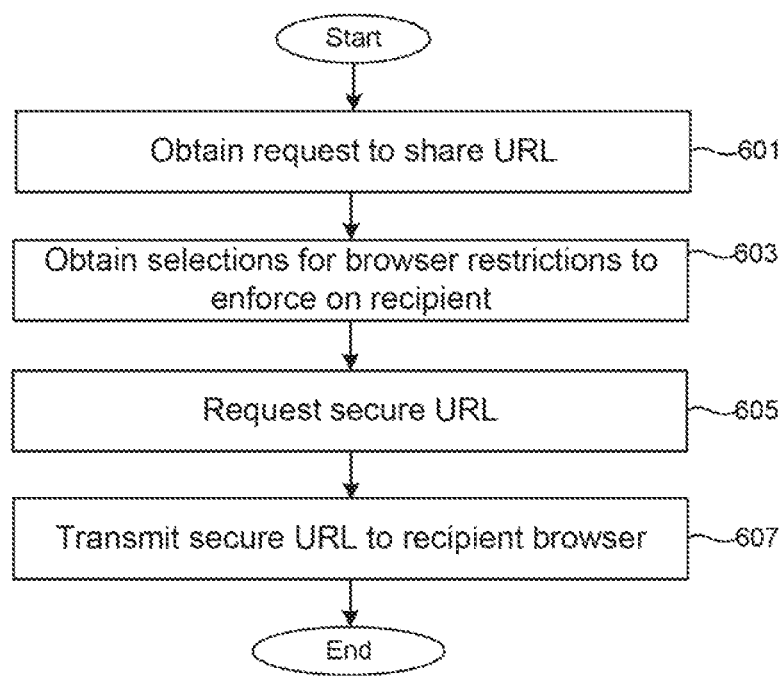
FIG. 6 is a flowchart that illustrates functionality according to an example of the disclosure.

Referring next to FIG. 6, shown is a flowchart and illustrates functionality of the secure sharing service 521 in a browser 103 according to an example of the disclosure. The functionality illustrated in FIG. 6 can be implemented by a browser 103 on a sender device 201, or a browser 103 from which a user can share a URL 105. Although the flowchart is discussed with respect to being performed within the browser 103, the functionality can also be implemented by a browser extension or plug-in. FIG. 6 illustrates a process whereby the browser 103 can request a shared URL 108 from the secure link generator 504.

First, at step 601 the secure sharing service 521 can obtain a request to share a URL 105. The request can be triggered by the user activating a sharing feature from within the browser 103. The sharing feature can generate a shared URL 108 that corresponds to the URL 105 that the user wishes to share.

At step 603, the secure sharing service 521 can obtain selections for browser restrictions that should be enforced on the receiving browser 103. The selections can be obtained through a user interface element that allows a user to choose which restrictions should be associated with a shared URL 108. The selections can also be obtained from a policy that is installed on a sender device 201 by a management service or mobile device management (MDM) framework with which the computing device 201 is enrolled as a managed device.

At step 605, the securing sharing service 521 can request a shared URL 108 from the secure link generator 503. The request can include the selected browser restrictions that should be enforced on a device that receives the shared URL 108.

At step 607, upon obtaining the shared URL 108, the secure sharing service 521 can transmit the shared URL 108 to the receiving browser 103. The shared URL 108 can be shared by a user in an email or other messaging service. The shared URL 108 can also be transmitted directly to the recipient device 203 by the secure sharing service 521 using an integrated messaging feature that permits browser 103 to browser 103 communication among users. After transmission of the shared URL 108 to the receiving browser 103, the process can proceed to completion.

Figure 7:
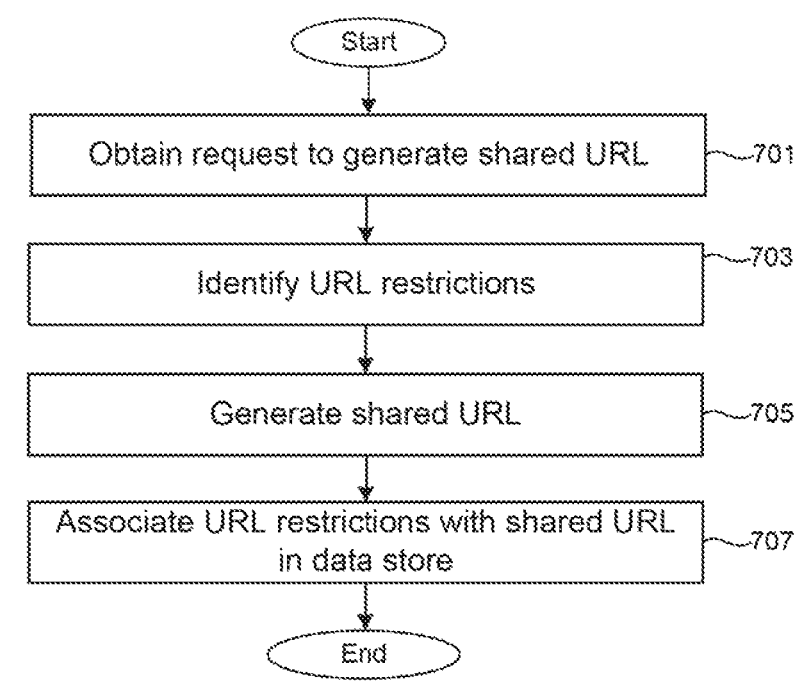
FIG. 7 is a flowchart that illustrates functionality according to an example of the disclosure.

Referring next to FIG. 7, shown is a flowchart and illustrates functionality of the secure link generator 503 according to an example of the disclosure. The functionality illustrated in FIG. 7 can be implemented by a computing environment 501. FIG. 7 illustrates a process whereby the secure link generator 503 can generate a shared URL 108 that can later be validated by the URL restriction validator 505.

First, at step 701, the secure link generator 503 can obtain a request to generate a shared URL 108. The request can be received from the secure sharing service 521 and include one or more URL restrictions 518 selected by the user or defined by an enterprise policy stored on the sender device 201 or in a data store accessible to the secure link generator 503.

At step 703, the secure link generator 503 can identify the URL restrictions 518 associated with the request. As noted above, the URL restrictions 518 can be selected by the user or defined by an IT administrator managing a user account of the user. The URL restrictions 518 can be retrieved by the secure link generator 503 from an enterprise-level policy that is stored in a data store accessible to the secure link generator 503. The enterprise-level policy can be applied to particular users, user groups, or domain names.

At step 705, the secure link generator 503 can generate the secure URL 108. The secure URL 108 can point to a server address associated with the URL restriction validator 505. The secure URL 108 can also be uniquely associated with the URL 105 and the URL restrictions 518 that correspond with the request to share the URL 105. The URL restriction validator 505 can either generate a page that validates that the browser 103 accessing the shared URL 108 complies with the URL restrictions 218 or generates a VD session executing a browser 103 that ensures enforcement of the URL restrictions 218.

At step 707, the secure link generator 503 can associate the URL restrictions 518 with the URL 105 and the shared URL 108 in the data store 509. In some implementations, the URL restrictions 518 can be uniquely associated with the request to share the URL 105 received from the sender device 201. In other implementations, the URL restrictions 518 can be unique only with respect to the URL 105 and not with respect to a particular request. Accordingly, the shared URL 108 can have a unique URL parameter or URL address that is associated with the URL restrictions 218 in the data store. Thereafter, the process can proceed to completion.

Figure 8:
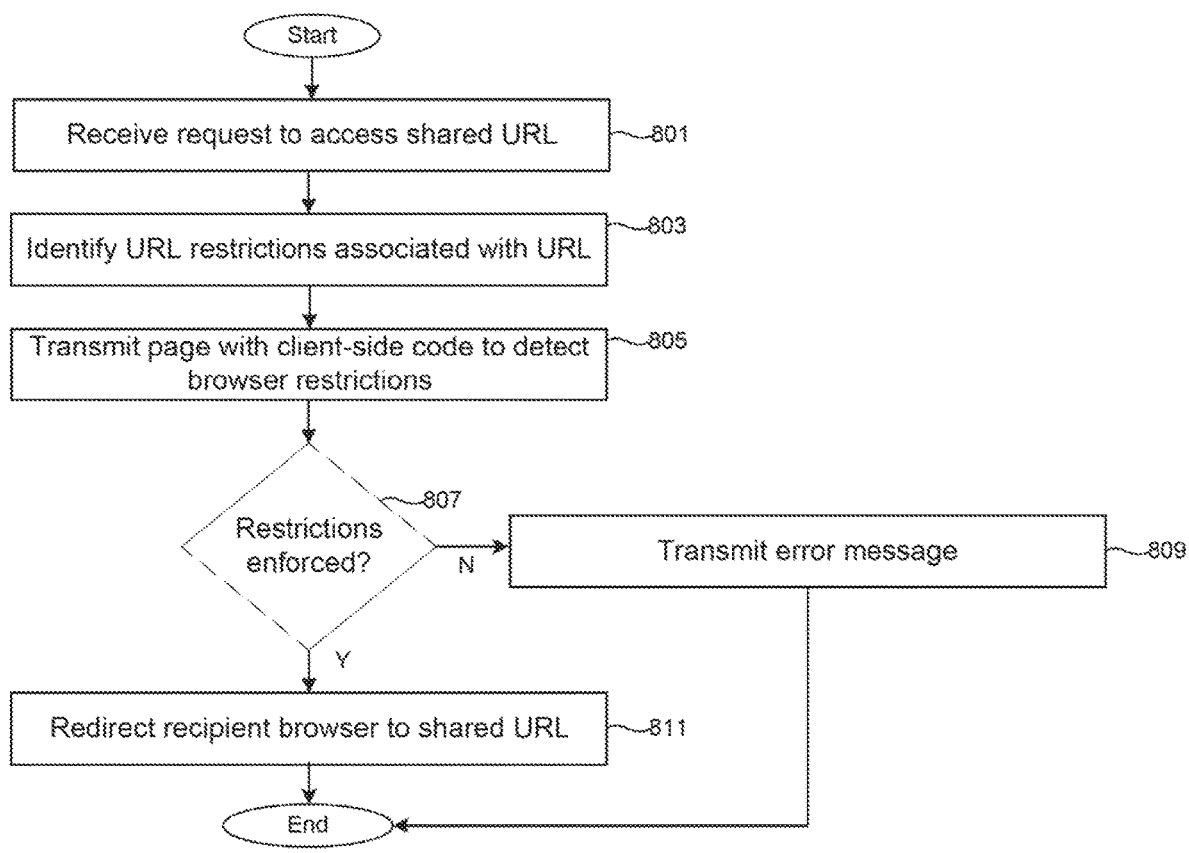
FIG. 8 is a flowchart that illustrates functionality according to an example of the disclosure.

Referring next to FIG. 8, shown is a flowchart and illustrates functionality of the URL restriction validator 505 according to an example of the disclosure. The functionality illustrated in FIG. 8 can be implemented by a computing environment 501. FIG. 7 illustrates a process in which the URL restriction validator 505 can validate that the URL restrictions 518 associated with a shared URL 108 generated by the secure link generator 503 are being enforced by a browser 103 on a recipient device 203.

First, at step 801, the URL restriction validator 505 can receive a request to access a secure URL 108. The shared URL 108 can be generated by the secure link generator 503 to point to a server address associated with the URL restriction validator 505.

At step 803, the URL restriction validator 505 can identify one or more URL restrictions 518 associated with the shared URL 108. As noted above, the URL restrictions 518 can be uniquely associated with the request to share the URL 105 received from the sender device 201. In other implementations, the URL restrictions 518 can be unique only with respect to the URL 105 and not with respect to a particular request. Accordingly, the URL restriction validator 505 can identify the URL restrictions 518 associated with the shared URL 108 based on the association between the two in the data store 509.

At step 805, the URL restriction validator 505 can send URL restriction validator service can validate the URL restrictions by sending a page that includes server-side code as well as client-side code that tests whether the selected URL restrictions are being enforced by the browser 103 that is accessing the shared URL 108. For example, the URL restriction validator 505 service can present a page that includes JavaScript code that attempts to start a local runtime environment, such as Java, run Flash code, or store a tracking cookie. If any of these attempts are successful, the URL restriction validator 505 can determine that the URL restrictions 518 are not being enforced and present an error message rather than the content at the URL 105.

At step 807, based upon the results of the validation code presented in the content page, the URL restriction validator 505 can determine whether the URL restrictions 518 are being enforced by the browser 103. If they are being enforced, the process proceeds to step 811, where the URL restriction validator 505 redirects the browser 103 the URL 105. If they are not being enforced, the process proceeds to step 809, where the URL restriction validator 505 presents an error message instead of redirecting the browser 103 to the URL 105. Thereafter, the process proceeds to completion.

Figure 9:
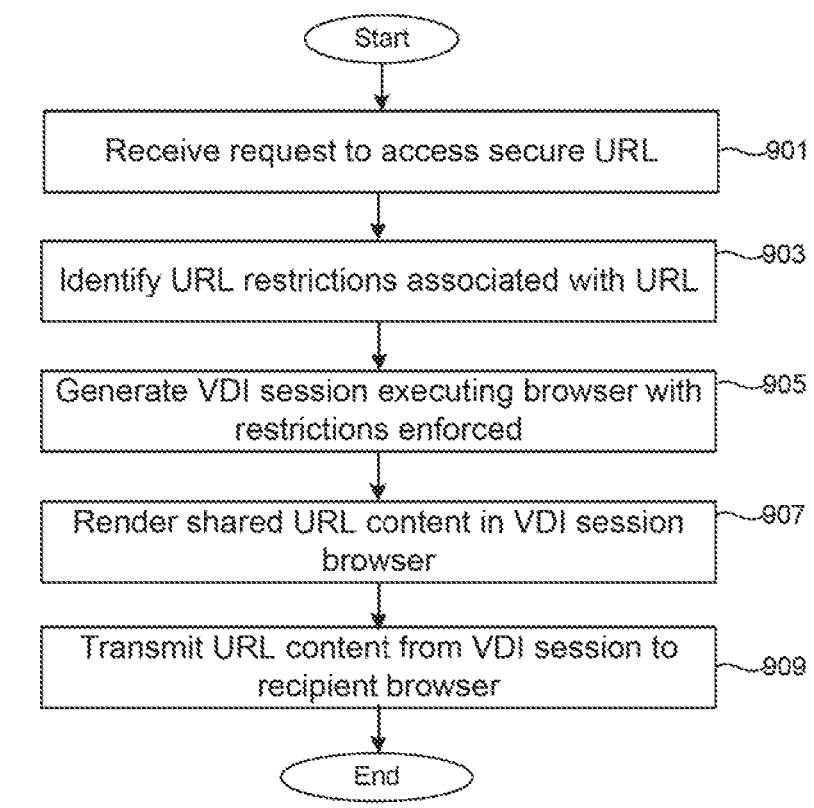
FIG. 9 is a flowchart that illustrates functionality according to an example of the disclosure.

Referring next to FIG. 9, shown is a flowchart and illustrates functionality of the URL restriction validator 505 according to an example of the disclosure. The functionality illustrated in FIG. 9 can be implemented by a computing environment 501. FIG. 7 illustrates a process in which the URL restriction validator 505 can generate a VDI session running a browser that retrieves content from the URL 105 to ensure that compliance with the URL restrictions 518 is met.

First, at step 901, the URL restriction validator 505 can receive a request to access a shared URL 108. The request can be received from a recipient device 203 with which the shared URL 108 was provided. The shared URL 108 can be generated by the secure link generator 503 to point to a server address associated with the URL restriction validator 505.

At step 903, the URL restriction validator 505 can identify one or more URL restrictions 518 associated with the shared URL 108. As noted above, the URL restrictions 518 can be uniquely associated with the request to share the URL 105 received from the sender device 201. In other implementations, the URL restrictions 518 can be unique only with respect to the URL 105 and not with respect to a particular request. Accordingly, the URL restriction validator 505 can identify the URL restrictions 518 associated with the shared URL 108 based on the association between the two in the data store 509.

At step 905, can generate a VDI session that corresponds to the request made to the shared URL 108. The VD session created by the URL restriction validator 505 can run a browser 103 with the URL restrictions 518 corresponding to the shared URL 108 enabled. For example, the browser 103 in the VDI session can have a local runtime environment such as Java disabled. The browser 103 can also have other plugins or tracking cookies disabled. The browser 103 can also be running in private browsing mode if the URL restrictions 518 specify a private browsing mode.

At step 907, the URL restriction validator 505 can cause the browser 103 in the VDI session to obtain and render data from the URL 105 corresponding to the shared URL 108. In one implementation, the URL 105 can be suppressed or hidden from the user of the recipient device 203.

At step 909, the URL restriction validator 505 can transmit the URL content rendered in the browser 103 in the VDI session to the recipient device 203. The URL content can be transmitted as one or more images that can be rendered in the browser 103 on the recipient device 203. The one or more images that also be presented along with a bitmap so that if the user follows any links presented in the URL content, the location of a user click or tap can be provided to the browser 103 in the VDI session, which can retrieve the link followed by the user on the recipient device 203. Thereafter, the process proceeds to completion.

The flowcharts of FIGS. 3-4 and 6-9 show an example of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 3-4 and 6-9 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The sender device 201, recipient device 203, computing environment 501, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The browser 103, URL restriction validator 505, secure link generator 503, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

What is claimed is:

1. A system for sharing content between a sending device and a recipient device comprising:
a computing device comprising a processor and a memory, the computing device executing a browser, wherein the browser is configured to at least:
receive a request to share a uniform resource locator (URL);
determine that the request requires a recipient browser to open the URL in a private browsing mode; and
generate a shared URL for transmission to the recipient browser, the shared URL including an indication to open the URL in the private browsing mode in the recipient browser, wherein the shared URL comprises a link to a URL restriction validator, the URL restriction validator comprising a server that confirms that the recipient browser is accessing the shared URL in a private browsing mode before redirecting the recipient browser to the URL.

2. The system of claim 1, wherein the request to share the URL is received by:
detecting a right-click or a long-press on the URL in the browser; and
detecting selection of an option to share the URL to a recipient in the private browsing mode.

3. The system of claim 1, wherein the shared URL is generated by modifying the URL to include a command directing the recipient browser to open the URL in the private browsing mode.

4. The system of claim 3, wherein the command directing the recipient browser is contained within a URL parameter appended to the shared URL.

5. The system of claim 1, wherein the shared URL is generated by encrypting the URL, wherein the recipient browser is configured to decrypt the encrypted URL.

6. The system of claim 1, wherein the shared URL comprises a link to a URL restriction validator, the URL restriction validator comprising a server that executes a virtual desktop infrastructure (VDI) session running a browser that accesses the URL in the private browsing mode and provides content retrieved from the URL to the recipient browser without providing the markup language associated with the content to the recipient browser.

7. A method for sharing content between a sending device and a recipient device comprising:
receiving a request to share a uniform resource locator (URL);
determining that the request requires a recipient browser to open the URL in a private browsing mode; and
generating a shared URL for transmission to the recipient browser, the shared URL including an indication to open the URL in the private browsing mode in the recipient browser wherein the shared URL comprises a link to a URL restriction validator, the URL restriction validator comprising a server that confirms that the recipient browser is accessing the shared URL in a private browsing mode before redirecting the recipient browser to the URL.

8. The method of claim 7, wherein receiving the request to share the URL further comprises:
detecting a right-click or a long-press on the URL in the browser; and
detecting selection of an option to share the URL to a recipient in the private browsing mode.

9. The method of claim 7, wherein generating the shared URL further comprises modifying the URL to include a command directing the recipient browser to open the URL in the private browsing mode.

10. The method of claim 9, wherein the command directing the recipient browser is contained within a URL parameter appended to the shared URL.

11. The method of claim 7, wherein the shared URL comprises a link to a URL restriction validator, the URL restriction validator comprising a server that confirms that the recipient browser is accessing the shared URL in a private browsing mode before redirecting the recipient browser to the URL.

12. The method of claim 7, wherein the shared URL is generated by encrypting the URL, wherein the recipient browser is configured to decrypt the encrypted URL.

13. The method of claim 7, wherein the URL restriction validator further comprises a server that executes a virtual desktop infrastructure (VDI) session running a browser that accesses the URL in the private browsing mode and provides content retrieved from the URL to the recipient browser without providing the markup language associated with the content to the recipient browser.

14. A non-transitory computer-readable medium comprising machine-readable instructions for sharing content between a sending device and a recipient device comprising:
receive a request to share a uniform resource locator (URL);
determine that the request requires a recipient browser to open the URL in a private browsing mode; and
generating a shared URL for transmission to the recipient browser, the shared URL including an indication to open the URL in the private browsing mode in the recipient browser, wherein the shared URL comprises a link to a URL restriction validator, the URL restriction validator comprising a server that confirms that the recipient browser is accessing the shared URL in a private browsing mode before redirecting the recipient browser to the URL.

15. The non-transitory computer-readable medium of claim 14, wherein the request to share the URL is received by:
   detecting a right-click or a long-press on the URL in the browser; and
   detecting selection of an option to share the URL to a recipient in the private browsing mode.

16. The non-transitory computer-readable medium of claim 14, wherein the shared URL is generated by modifying the URL to include a command directing the recipient browser to open the URL in the private browsing mode.

17. The non-transitory computer-readable medium of claim 16, wherein the command directing the recipient browser is contained within a URL parameter appended to the shared URL.

18. The non-transitory computer-readable medium of claim 14, wherein the shared URL is generated by encrypting the URL, wherein the recipient browser is configured to decrypt the encrypted URL.

\* \* \* \* \*